United States Patent [19]
Krishnamurthy et al.

[11] Patent Number: 5,642,154
[45] Date of Patent: Jun. 24, 1997

[54] CABLE MAINTENANCE SYSTEM

[75] Inventors: Gopalan Krishnamurthy, Wheeling; Gary J. Sgrignoli, Mount Prospect, both of Ill.

[73] Assignee: Zenith Electronics Corporation, Glenview, Ill.

[21] Appl. No.: 301,931

[22] Filed: Sep. 7, 1994

[51] Int. Cl.$^6$ ............................................. H04N 17/00
[52] U.S. Cl. ........................... 348/12; 348/13; 348/192; 455/6.1
[58] Field of Search ........................... 348/6, 192, 193, 348/13, 180; 333/237; 455/6.1, 14, 611, 69; H04N 17/00, 17/02

[56] References Cited

U.S. PATENT DOCUMENTS

| | | | |
|---|---|---|---|
| 4,648,123 | 3/1987 | Schrock | 348/9 X |
| 5,073,822 | 12/1991 | Gumm et al. | 348/6 X |
| 5,208,666 | 5/1993 | Elkind et al. | |
| 5,309,376 | 5/1994 | Barraco et al. | 348/180 X |

*Primary Examiner*—Michael H. Lee
*Assistant Examiner*—Nathan J. Flynn

[57] ABSTRACT

A cable system includes a cable head end and a plurality of distribution sites having equipment for supplying subscriber station receivers with digital video cable signals from the cable head end. The digital video signal includes a robust data component that is receivable by distribution site receivers and cable subscriber station receivers under very poor carrier-to-noise conditions, that is, where the video signal itself is not usable. The cable head end has capabilities for interrogating distribution site receivers and subscriber station receivers which respond by transmitting designated information concerning differences between the received robust data component and the transmitted robust data component. At the subscriber station receivers, the robust data component is in the form of a training sequence of known characteristics that is compared with a received training sequence. The subscriber station receiver has an equalizer with equalization taps that are changed in accordance with the training sequence comparison. The tap settings are recorded in a register which is interrogated by the cable head end. The distribution site receivers include fixed gain RF amplifiers and develop an IF AGC signal through the use of a counter and a digital-to-analog converter. The counter records in a register the developed IF AGC control voltage which is supplied to the cable head end upon interrogation. The distribution site amplifier receivers also provide information concerning carrier-to-noise ratio and data segment errors.

11 Claims, 3 Drawing Sheets

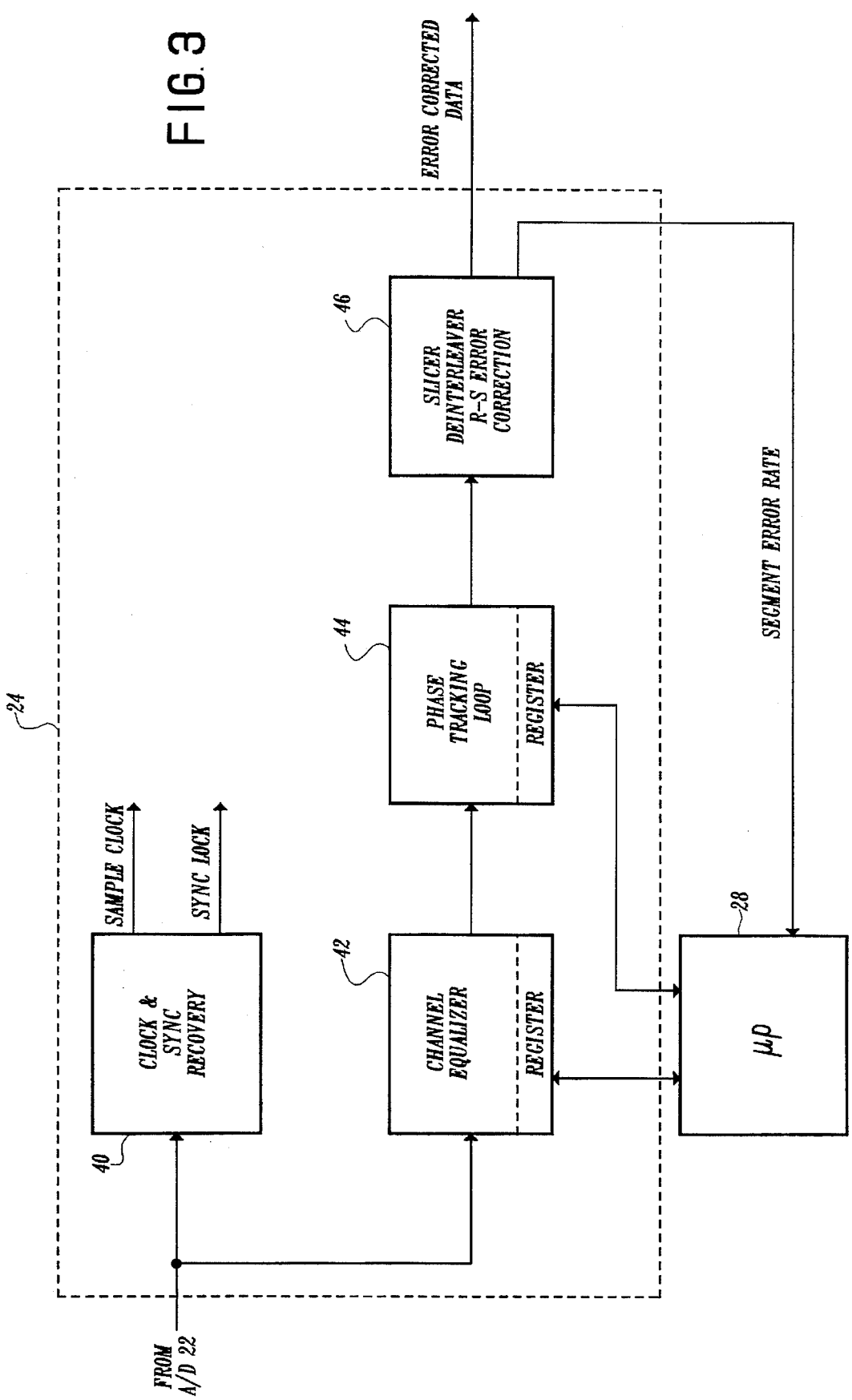

CABLE MAINTENANCE SYSTEM

BACKGROUND OF THE INVENTION AND PRIOR ART

This invention relates to cable systems that utilize amplifiers and other equipment at a limited number of distribution sites for providing cable signals to receivers at a plurality of subscriber stations. In particular, it relates to a cable system that has a built-in or self maintenance capability by virtue of the type of signals used.

All cable systems require periodic maintenance to insure delivery of proper signals over the full frequency range of the cable system frequency spectrum. All of the various receiver-amplifiers in the cable system should be periodically checked for distortion levels and frequency response. At present this is often accomplished by injecting a high (or low) level sweep signal into the channels of the cable band. A portable receiver of some type displays the sweep signal response at any receiver and appropriate adjustments in the signal from the distribution site or the cable head end are made as required. While the injected sweep signal interferes with the desired television signal, its effect is minimal and not objectionable for analog signals such as NTSC signals.

Many installed cable plants have a two-way communication capability, i.e. they have the ability to transmit signals from the subscriber receivers to the cable head end. These return transmissions are typically accomplished at a minimal data rate via a separate out-of-band signal.

It would be of significant advantage for a cable system operator to have knowledge of the actual signal levels being received at the various subscriber stations of the cable system. Such information can be used as a powerful diagnostic tool to isolate regions of low signal to noise (S/N) ratios, pinpoint defective amplifiers in the system, etc.

The known signal injection system can be used (with additional appropriate circuitry) at the subscriber stations, but such would be very expensive to implement. Further, with the coming use of digital video signals in cable systems, injecting a sweep signal across the cable band would be highly objectionable because significant portions of data would be lost.

Recently, Zenith developed and proposed for terrestrial standardization a multilevel VSB transmission system, for example, 8-level data and 2-level sync. For cable use, the system is 2/4/8/16 VSB because of the relatively benign cable environment. In accordance with the invention, this VSB system does not require the injection of a test signal for performing maintenance on a two way cable system. Further, in accordance with the invention, a two way cable system can readily have the capability of automatically monitoring the amplifiers in subscriber station cable boxes and detecting faulty or poor signal sites with a simple personal computer. This may be accomplished because the Zenith VSB transmission system includes a robust data component, specifically a two level training sequence that is used for equalization purposes. (There are also two level sync symbols and a small pilot signal in the Zenith signal.) The pilot insures carrier recovery independent of data and the use of both segment sync and frame sync signals permits symbol clock recovery and channel equalization even under conditions when the video data itself is unusable. The carrier sync clock recovery can occur at signal to noise (or carrier-to-noise) ratios as low as 0 dB. Channel equalization, which is accomplished with the two level training sequence data, can occur at S/N ratios close to the noise threshold of two level data, i.e. 2 VSB. Typically cable systems provide a carrier-to-noise (C/N) ratio of better than 40 dB and consequently a cable system incorporating a robust data component, according to the invention, in its signal and having appropriate receivers can provide significant diagnostic information despite failures or conditions that result in extremely poor or unusable signals. For example, a trunk or distribution amplifier with bridging will result in the signal being reduced in level.

While the inventive system just described uses the Zenith VSB transmission system, those skilled in the art will readily perceive that any video signal that includes a robust data component may be used to provide the self monitoring features of the invention.

OBJECTS OF THE INVENTION

A principal object of the invention is to provide an improved cable system.

Another object of the invention is to provide automatic cable system maintenance information by incorporating a known robust data component in the transmitted video signal.

BRIEF DESCRIPTION OF THE DRAWINGS

These and other objects and advantages of the invention will be apparent upon reading the following description in conjunction with the drawings, in which:

FIG. 3 is a more detailed block diagram of the digital logic block of the receiver of FIG. 2.

DESCRIPTION OF THE PREFERRED EMBODIMENT

Figure 1:
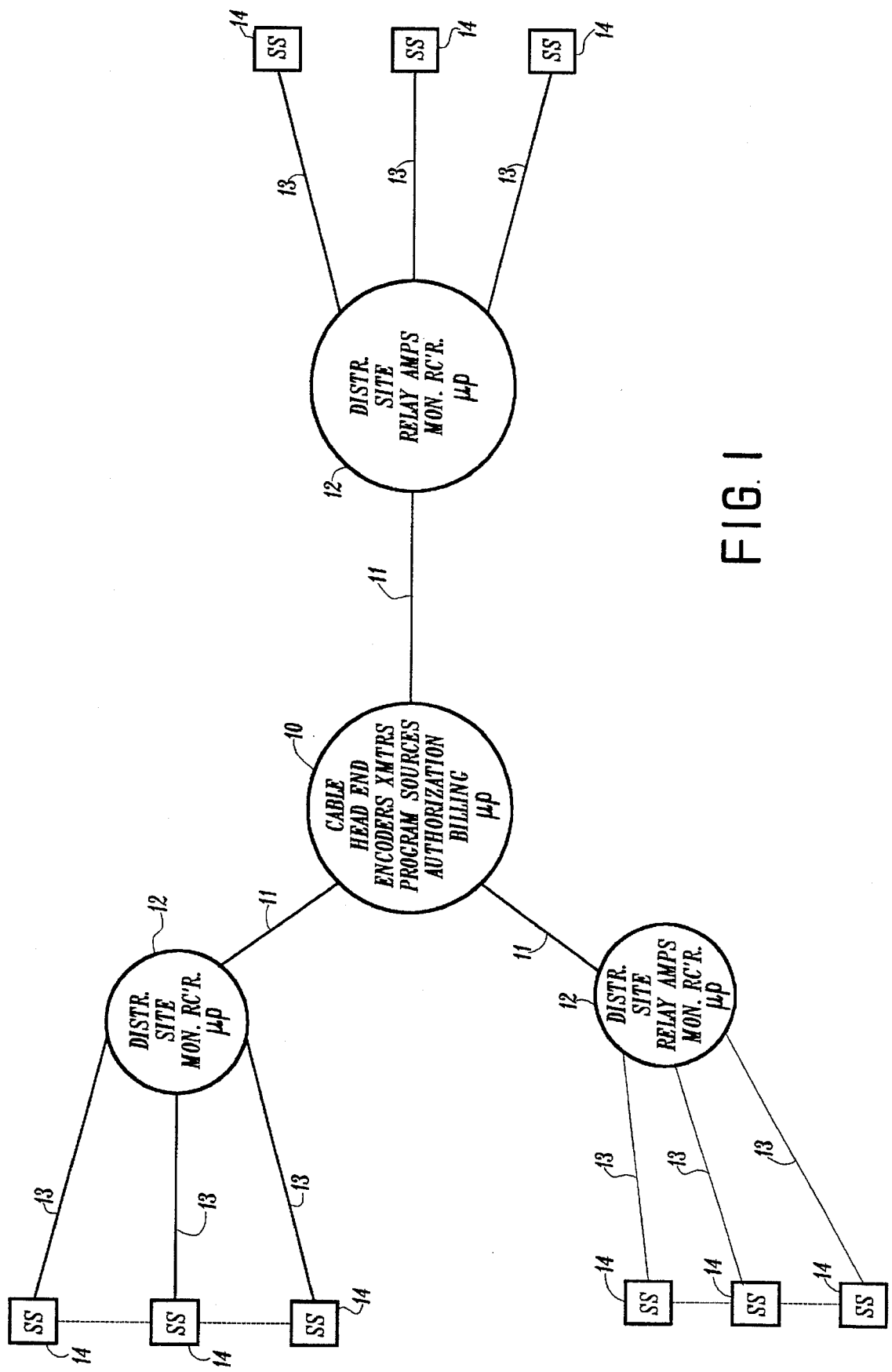
FIG. 1 is a simplified schematic diagram of a cable plant.

For cost purposes, the system of the invention uses two types of cable receivers, one being installed at each subscriber station where automatic signal monitoring is desired and another being used at the limited number of distribution sites that service the subscriber stations. Referring to FIG. 1, a cable plant includes a cable head end 10 that incorporates various encoders, transmitters, program sources, authorization billing computers, etc. and a microprocessor-based controller. The cable head end 10 is linked via cables 11 to distribution sites 12 at which signal translation equipment, such as various repeating amplifiers, is installed. As illustrated, the distribution sites may also include a microprocessor controlled monitor type receiver. Preferably, these receivers are modified Zenith VSB receivers, which are used in the subscriber stations 14, and are interconnected by cables 13 to the distribution sites. The use of modified receivers, as mentioned, is for cost purposes since the proposed Zenith VSB cable receivers use analog IF AGC circuits in which AGC values cannot readily be interrogated by the cable head end. The modified receivers used at the distribution sites 12, as will be seen, include a counter for recording up and down steps for the IF AGC signal and a digital-to-analog (D/A) converter for converting the count of the counter to the analog IF AGC voltage. Since D/A converters are expensive, they are not proposed for use in the individual subscriber stations 14, although, it will be appreciated, that the invention is not limited to this arrangement.

The present Zenith 2/4/8/16 VSB cable receiver is designed so that a PC (personal computer) can interrogate the receiver. The cable head end can also interrogate the receivers at the subscriber stations (through their unique addresses). The interrogations can obtain the various equalizer tap settings and the noise power. These quantities are referred to in the design as Equalizer, S/N Input and Output and Tap Energy. (The Tap Energy is based upon the filter tap coefficients.) The received information can be processed by the PC (or by the cable head end) to determine signal to noise ratio, reflections in the channel and the like. The cable head end can periodically monitor all of the subscriber station receivers (cable boxes) and take corrective action if the signals being received thereat are not deemed to be satisfactory. The subscriber station receiver also has the capability of displaying diagnostic information locally to facilitate any needed repairs.

Figure 2:
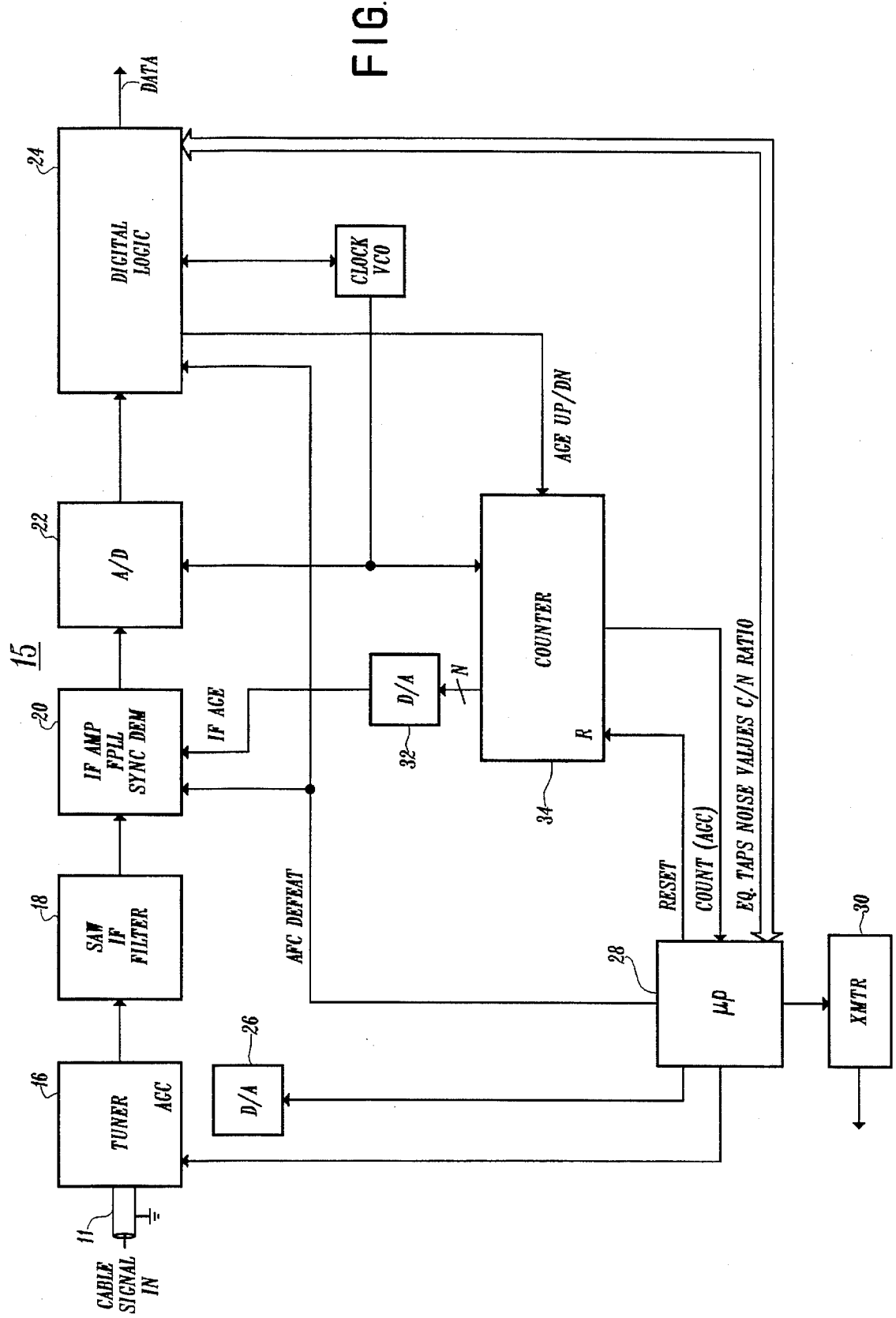
FIG. 2 is a partial block diagram of a receiver for use in a cable system operated in accordance with the invention.

The second receiver, that is the one that is modified for use at the distribution sites 12, is shown in FIG. 2. It differs from the first receiver in that it includes a counter and a D/A converter for developing the IF AGC. In the Zenith VSB receiver at the subscriber station, the IF AGC potential is developed by a charge pump which directly charges and discharges an IF AGC capacitor. The modified receiver also has a fixed RF AGC that is optimized for a given location since the receiver location and the signal conditions thereat will generally be known.

The receiver, generally designated by reference 15, includes a cable signal input 11 for coupling cable signals from the cable head end to a tuner 16, that in turn supplies the selected signal (in IF form) to a SAW IF filter 18. The output of SAW IF filter 18 is coupled to an IF amplifier, FPLL and synchronous demodulator arrangement 20 which develops a signal that is applied to an A/D converter 22 and thence to a digital logic block 24. A microprocessor 28 controls the operation of receiver 15 and supplies channel selection information and AGC information (via D/A 26) to tuner 16, AFC defeat signals to blocks 20 and 24, a reset signal to a counter 34 and the interrogation information requested by the cable head end or by a PC. In the case of a two way communication cable system, a transmitter 30 transmits such information back to the cable head end 10. For a PC interrogation, a jack on the receiver is engaged with a plug from the PC. It will be appreciated that all of this equipment and the equipment in the various blocks is well known in the cable art.

A clock VCO 36 applies timing signals to digital logic block 24, A/D 22 and counter 34. An IF AGC is developed from digital logic 24 and is supplied to counter 34. The count information in counter 34 supplies a D/A 32 for application (as a corresponding analog signal) to the IF AGC input of block 20. Counter 34 also supplies count information to microprocessor 28. Finally, the equalization taps, noise values and C/N ratio determined by suitable apparatus in digital logic block 24 is supplied to microprocessor 28. All of this information is available upon interrogation by a PC or via the cable head end. Such information is transmitted by transmitter 30 in response to such interrogation.

In FIG. 3, details of digital logic block 24 are disclosed. As indicated by the dashed line, digital logic block 24 includes a recovery circuit 40 for recovering clock and frame and segment information, a channel equalizer 42, a phase tracking loop 44 and a slicer, deinterleaver and an R-S error correction circuit 46. The output from A/D 22 is applied to recovery circuit 40 which produces a sample clock and a sync lock output signal. The A/D signal is also applied to channel equalizer 42, which is under control of microprocessor 28. Channel equalizer 42 in turn is coupled to phase tracking loop 44, the output of which supplies block 46. Error corrected data and the segment data error rate are outputted from block 46. Microprocessor 28 communicates with channel equalizer 42 and phase tracking loop 44 and obtains information as to the status of registers in these components. The frame sync (framing code) is two level data for a robust or rugged system. The equalizer 42 yields total noise, i.e. white noise, phase noise and intersymbol interference. The phase tracking loop yields only the white noise.

As mentioned, the modified receiver is used at the distribution sites and at any other critical node in the cable system, such as at a trunk amplifier, to monitor the system signal response up to that point. The receivers at the subscriber stations are substantially the same except for the counter and D/A converter for the IF AGC and the use of fixed RF AGC.

The RF AGC is fixed in the FIG. 2 receiver with a programmable value that is determined by the dynamic signal levels present at the particular node or distribution site where the receiver is positioned. This programmable value is established to permit proper signal levels to the RF stage at the location. The IF AGC is controlled by the digital logic circuit 24 which operates on either the data or on the two level segment signals used in the VSB system. AGC up and AGC down control signals are developed and supplied as an input to the up/down counter 34. The count value of counter 34 is converted by the D/A 32 into an analog gain control voltage for the IF amplifier and this count value is also supplied to the microprocessor 28. A PC, or the computer at the cable head end, can readily interrogate microprocessor 28 and obtain the IF AGC count value, which represents the relative gain of the particular channel and hence absolute signal levels. The tap values from equalizer 42 and the reference signal noise power from the phase tracking block 44 in the digital logic block 24 and the IF and RF AGC count values can accurately characterize the signal for the selected channel (at the node point). As mentioned previously, the receiver AGC sets up by looking at the data or at the segment sync. While certain cable reception and ghosting conditions can cause the segment sync amplitude to vary and prevent the IF AGC in the FIG. 2 receiver from completely specifying the received signal level, additional correction is available from the equalizer taps. The equalizer looks at the received training sequence and compares its characteristics with a stored training sequence (representing the transmitted training sequence) and corrects for any residual gain errors. The tap coefficients provide that information.

It will also be appreciated that the tuner 16 may be selectively tuned to different channels in the cable system in response to appropriate in-band or out-of-band signals from the cable head end to read out the various data, such as RF and IF AGC, equalizer taps, noise values, etc. for each channel and to supply the information back to the cable head end.

The received noise power is obtained from the receiver phase noise correction circuit so that phase noise that may be introduced by a conversion process is not included in the C/N calculation. The C/N can be calculated from the received noise power given the received data levels. This is because the received data levels are expected to be random and the RMS values provide relative average carrier power. Enough diagnostic information is available from both types of receiver to determine frequency response, C/N and cable reflections over the entire band, assuming the channels that are tested carry appropriate signals with a known robust data component. Signal level information can only be obtained from the modified receiver which has a digitally based AGC system.

The cable operator need merely interrogate (on a low data rate basis) all or selected ones of the receivers that receive the known robust data component. For self maintenance across the entire spectrum, various channels spaced throughout the frequency range of the cable system may carry the robust data component.

It will be appreciated that the description of the particular system is necessarily general since the invention is not to be restricted to the use of any particular type of cable television signal. The criterion that must be met is that the cable signal must include a known robust data component that is recoverable by the various receivers in the cable system under extremely weak signal conditions when the video data signal is unusable, i.e. under fault conditions. This will permit the self maintenance capabilities as specified in this invention.

It is recognized that numerous changes in the described embodiment of the invention will be apparent to those skilled in the art without departing from its true spirit and scope. The invention is to be limited only as defined in the claims.

What is claimed is:

1. A self-maintenance cable system comprising:

a plurality of receivers for receiving digital video signals including signals having a fixed known data component having a first signal-to-noise characteristic and a variable data component having a second lower signal-to-noise characteristic;

a cable head end with microprocessor means for transmitting said digital video signals to said receivers and for interrogating said receivers, said receivers including means for transmitting information to said cable head end upon interrogation;

at least one of said digital cable signals transmitted by said cable head end to said receivers including said fixed known data component of said first signal-to-noise characteristic; and means in said receivers for developing and transmitting correction data to said cable head end based upon comparing said received fixed known data component with the transmitted fixed known data component.

2. The system of claim 1 wherein said receivers include registers for recording said correction data.

3. The system of claim 2 wherein said fixed known data component comprises a two-level symbol training sequence.

4. The system of claim 3 wherein said receivers include equalizing means having a plurality of taps for compensating for differences between the received training sequence and the transmitted training sequence, and means for storing information concerning said equalizer taps in said register.

5. The system of claim 2 wherein said fixed known data component comprises two-level symbol sync information.

6. The system of claim 5 wherein said receivers include fixed RF amplifiers and means for developing IF AGC signals.

7. The system of claim 6 wherein said receivers further include counters and D/A converters for developing said IF AGC signals, and means for supplying AGC signal information from said counters to said registers.

8. The system of claim 2 wherein said fixed known data component comprises a two-level symbol training sequence and two-level symbol sync information.

9. The system of claim 8 wherein said receivers include fixed RF amplifiers and means for developing IF AGC signals, and wherein said receivers further include counters and D/A converters for developing said IF AGC signals, and means for supplying information from said counters to said registers.

10. The system of claim 8, further including means for developing information concerning the carrier-to-noise ratio of said digital video cable signal based upon deviations between said sync information as transmitted and said sync information as received.

11. The system of claim 2 wherein said fixed known data component comprises a series of two-level symbols characterizing a framing code and further including means for determining deviations between transmitted and received framing codes for a plurality of said digital video cable signals.

* * * * *

UNITED STATES PATENT AND TRADEMARK OFFICE
CERTIFICATE OF CORRECTION

PATENT NO. : 5,642,154
DATED : June 24, 1997
INVENTOR(S) : Gopalan Krishnamurthy et al.

It is certified that error appears in the above-indentified patent and that said Letters Patent is hereby corrected as shown below:

On the Title page, under "[56] References Cited, U.S. PATENT DOCUMENTS"

| Add: | | | |
|---|---|---|---|
| -- 5,301,364 | 4-5-94 | Arens et al. | 455/69 |
| 4,777,653 | 10-11-88 | Bonnerot et al. | 455/69 |
| 5,289,459 | 2-22-94 | Brownlie | 455/69 |
| 5,465,398 | 11-7-95 | Flammer | 455/69 |
| 5,257,404 | 10-26-93 | Goreman et al. | 455/69 |
| 4,991,184 | 2-5-91 | Hashimoto | 455/69 |
| 4,827,511 | 5-2-89 | Masuko | 348/683 |
| 5,313,658 | 5-17-94 | Nakamura | 455/69 |
| 5,260,972 | 11-9-93 | Wang | 348/611 -- |

Signed and Sealed this

Second Day of June, 1998

*Attest:*

BRUCE LEHMAN

*Attesting Officer*  *Commissioner of Patents and Trademarks*